United States Patent
Hyun (10) Patent No.: US 9,380,296 B2
(45) Date of Patent: Jun. 28, 2016

(54) CAMERA MODULE, AUTO FOCUS METHOD AND AUTO FOCUS CALIBRATION METHOD

(71) Applicant: LG INNOTEK CO., LTD., Seoul (KR)

(72) Inventor: Jin Wook Hyun, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 185 days.

(21) Appl. No.: 13/738,554

(22) Filed: Jan. 10, 2013

(65) Prior Publication Data

US 2013/0182125 A1 Jul. 18, 2013

(30) Foreign Application Priority Data

Jan. 17, 2012 (KR) .................. 10-2012-0005184

(51) Int. Cl.
*H04N 17/00* (2006.01)
*H04N 5/232* (2006.01)

(52) U.S. Cl.
CPC .......... *H04N 17/00* (2013.01); *H04N 5/23212* (2013.01); *H04N 5/23216* (2013.01); *H04N 5/23293* (2013.01); *H04N 17/002* (2013.01)

(58) Field of Classification Search
USPC ....................................... 348/345
See application file for complete search history.

(56) References Cited

U.S. PATENT DOCUMENTS

2008/0079837 A1* 4/2008 Masubuchi .................. 348/345
2012/0044402 A1* 2/2012 Yamaguchi et al. ..... 348/333.11

* cited by examiner

*Primary Examiner* — Roberto Velez
*Assistant Examiner* — Yih-Sien Kao
(74) *Attorney, Agent, or Firm* — Birch, Stewart, Kolasch & Birch, LLP

(57) ABSTRACT

An exemplary embodiment of the present disclosure includes a touch detection unit detecting if a particular region of the image of the object displayed by the display unit is touched, a memory unit stored with an auto focus calibration code of the particular region detected by the touch detection unit, and an auto focus driving unit receiving a coordinate of the particular region detected by the touch detection unit, reading out from the memory unit an auto focus calibration code corresponding to the particular region of the image of the object displayed on the display unit, and driving an auto focus actuator.

12 Claims, 8 Drawing Sheets

| INFINITY AF calibration | | MACRO AF calibration | |
|---|---|---|---|
| address | data | address | data |
| 1 | REGION 1 code | N+1 | REGION 1 code |
| 2 | REGION 2 code | N+2 | REGION 2 code |
| •••• | •••• | ••• | •••• |
| ••• | •••• | ••• | •••• |
| N−1 | REGION N−1 code | 2N−1 | REGION N−1 code |
| N | REGION N code | 2N | REGION N code |

FIG. 1
(PRIOR ART)

→ CENTER REGION (A)

| 2 | 3 | 4 | 5 | 6 | 7 | 8 | 9 | 10 |
|---|---|---|---|---|---|---|---|---|
| 11 | 12 | 13 | 14 | 15 | 16 | 17 | ... | ... |
| ... | ... | ... | ... | ... | ... | ... | ... | ... |
| ... | ... | ... | ... | ... | ... | ... | ... | ... |
| ... | ... | ... | ... | 1 | ... | ... | ... | ... |
| ... | ... | ... | ... | ... | ... | ... | ... | ... |
| ... | ... | ... | ... | ... | ... | ... | ... | ... |
| ... | ... | ... | ... | ... | N-3 | N-2 | N-1 | N |

FIG. 10

| INFINITY AF calibration | | MACRO AF calibration | |
|---|---|---|---|
| address | data | address | data |
| 1 | REGION 1 code | N+1 | REGION 1 code |
| 2 | REGION 2 code | N+2 | REGION 2 code |
| .... | .... | ... | .... |
| ... | .... | ... | .... |
| N-1 | REGION N-1 code | 2N-1 | REGION N-1 code |
| N | REGION N code | 2N | REGION N code |

FIG. 11

CAMERA MODULE, AUTO FOCUS METHOD AND AUTO FOCUS CALIBRATION METHOD

Pursuant to 35 U.S.C. §119 (a), this application claims the benefit of earlier filing date and right of priority to Korean Patent Application No. 10-2012-0005184, filed on Jan. 17, 2012, the contents of which are hereby incorporated by reference in their entirety.

BACKGROUND OF THE DISCLOSURE

1. Field of Endeavor

The present disclosure relates to a camera module, an auto focus method and an auto focus calibration method.

2. Background

This section provides background information related to the present disclosure which is not necessarily prior art.

Generally, a camera module has a miniaturized size and is applied to mobile communication devices and various IT devices including camera phones, PDAs and smart phones.

In a case the camera module mounted with an actuator moves a lens barrel to perform an AF (Auto Focusing), a best focusing position is sought after by moving the lens from infinity to macro.

Figure 1:
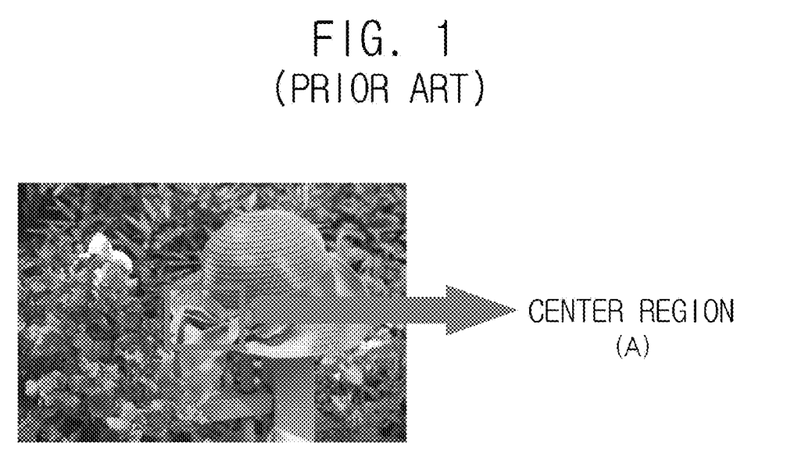
FIG. 1 is a photograph explaining an auto focus method according to prior art.

Referring to FIG. 1, a conventional camera module has an auto focusing object fixed to a center region (A), whereby, in a case an auto focus calibration is required during manufacturing of the camera module, the auto focusing is carried out based on a numerical resolution value at the center region.

Figure 2A:
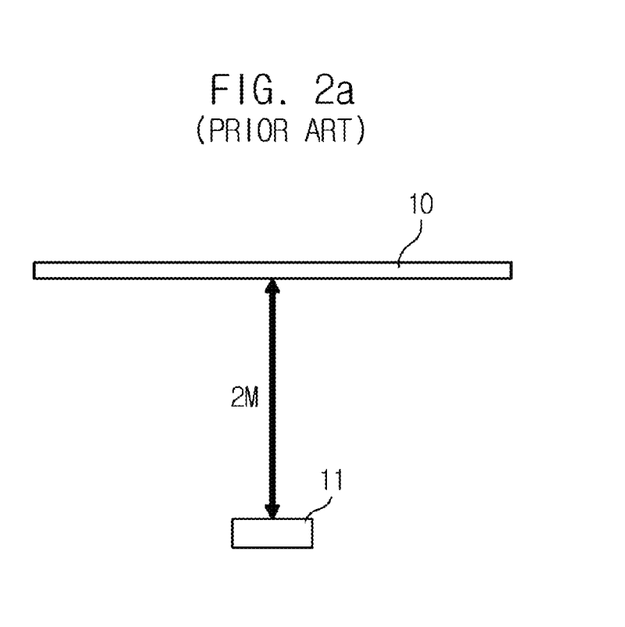
FIGS. 2a and 2b are schematic views illustrating an auto focus calibration according to prior art.
Figure 2B:
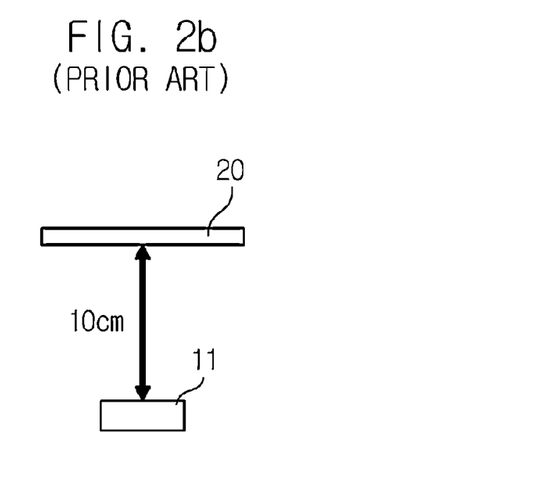
Figure 3:
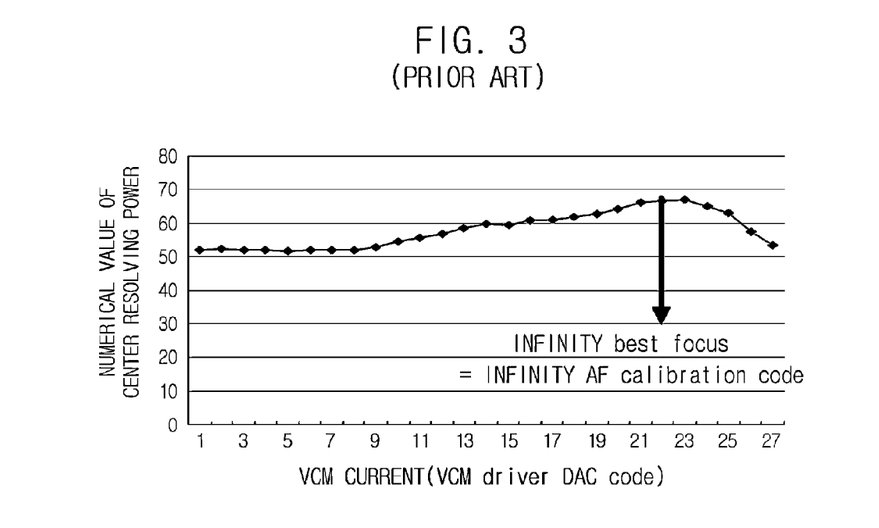
FIG. 3 is a graph illustrating a resolving power of infinity auto focus calibration according to prior art.
Figure 4:
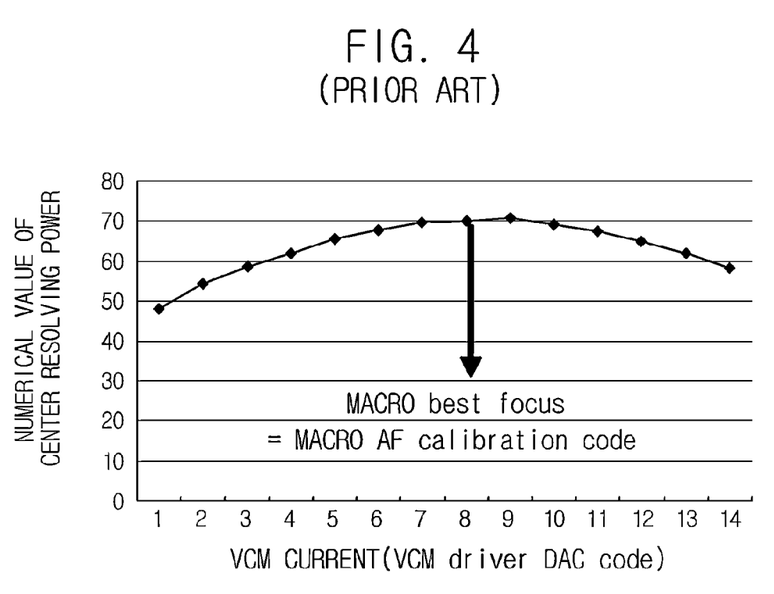
FIG. 4 is a graph illustrating a resolving power of macro auto focus calibration according to prior art.

At this time, as illustrated in FIGS. 2a and 2b, a resolving power is measured by increasing an actuator current (actuator driver digital analog converter (DAC) code) of a camera module (11) using a resolving power charts (10, 20) for macro and infinity, and a code with a highest resolving power, that is, best focus points are designated as auto focus calibration codes respectively for infinity and macro. Successively, the values thereof are stored in a memory embedded in the camera module.

Figure 5:
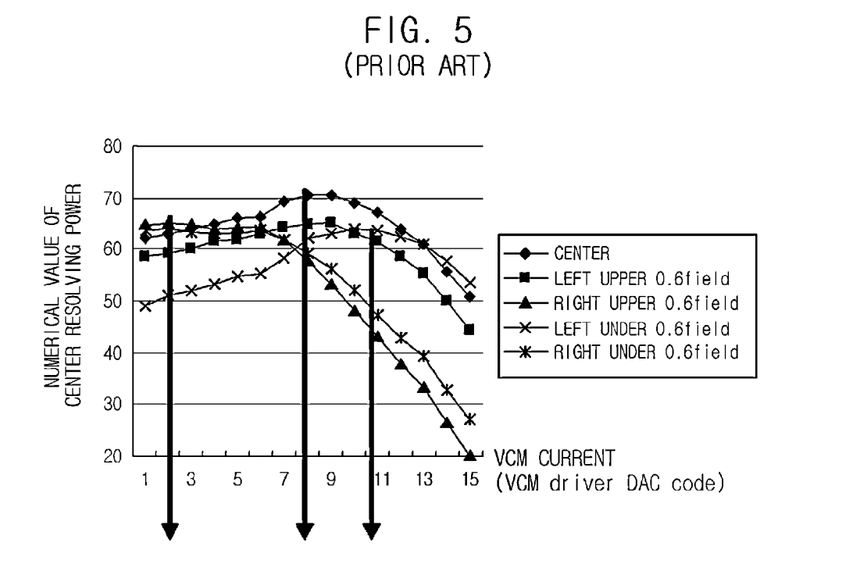
FIG. 5 is a graph illustrating a resolving power of infinity auto focus calibration of a region of an image photographed according to prior art.
Figure 6:
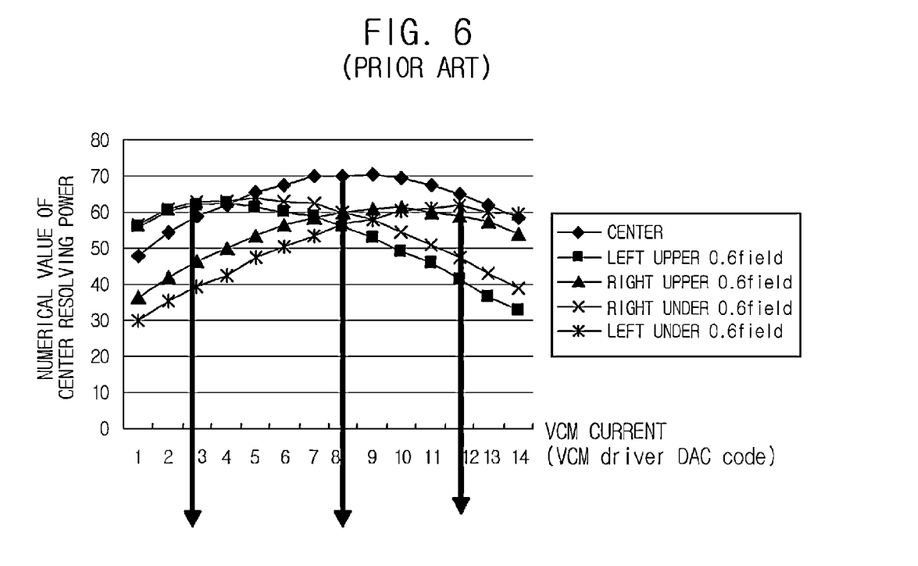
FIG. 6 is a graph illustrating a resolving power of macro auto focus calibration of a region of an image photographed according to prior art.

FIGS. 3 through 6 are graphs of the numerical value of center resolving power versus the voice coil motor (vcm) current. FIGS. 5 and 6 depict the values for the center, left upper 0.6 field, right upper 0.6 field, left under 0.6 field and right 0.6 field on a single graph.

Generally, a mobile terminal mounted with a camera module downloads the infinity and macro auto focus calibration codes stored in the memory, performs an auto-focus-scan from the infinity auto focus calibration code to the macro auto focus calibration code, and finds a position best suitable for focusing.

SUMMARY OF THE DISCLOSURE

This section provides a general summary of the disclosure, and is not a comprehensive disclosure of its full scope or all of its features.

The present disclosure provides a camera module, an auto focus method and an auto focus calibration method configured to decrease an auto focus time of a user-desired region from an image of an object, and to accurately adjust a focus.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a camera module, the camera module comprising: an image sensor photographing an image of an object; an image signal processor processing the image of the object photographed by the image sensor and outputting the processed image; a display displaying the image of the object processed by the image signal processor; a touch detector detecting if a particular region of the image of the object displayed by the display is touched; a memory stored with an auto focus calibration code of the particular region detected by the touch detector; and an auto focus driver receiving a coordinate of the particular region detected by the touch detector, reading out from the memory an auto focus calibration code corresponding to the particular region of the image of the object displayed on the display, and driving an auto focus actuator.

Preferably, but not necessarily, the memory may be stored with each of auto focus calibration codes of a plurality of regions divided from the image of the object.

Preferably, but not necessarily, the memory may be stored with look-up tables recorded with addresses allocated with codes relative to infinity auto focus calibration and macro auto focus calibration.

Preferably, but not necessarily, the particular region of the image of object displayed on the display may be one of a plurality of regions divided from the image of the object displayed on the display.

Preferably, but not necessarily, the each of the plurality of divided regions may have a same size.

Preferably, but not necessarily, the memory may be stored with different auto focus calibration codes each corresponding to the each of the plurality of divided regions.

Preferably, but not necessarily, addresses corresponding to each of the plurality of divided regions and the auto focus calibration codes may be sequentially recorded on the look-up table of the memory.

Preferably, but not necessarily, a center region of the image of the object in the plurality of divided regions may be allocated to a first address of the look-up table of the memory.

In another general aspect of the present disclosure, there is provided an auto focus method of a camera module, the method comprising: photographing an image of an object; displaying the photographed image of the object on a display; determining whether a predetermined region of the image of the object displayed on the display is touched; and reading out an auto focus calibration code of a predetermined region stored in the a memory to drive an auto focus actuator, in a case it is determined that the predetermined region of the image of the object displayed on the display is touched.

Preferably, but not necessarily, the memory may be stored with each of auto focus calibration codes of a plurality of regions divided from the image of the object.

Preferably, but not necessarily, the predetermined region of the image of object displayed on the display may be one of a plurality of regions divided from the image of the object displayed on the display.

Preferably, but not necessarily, the each of the plurality of divided regions may have a same size.

Preferably, but not necessarily, the memory may be stored with different auto focus calibration codes each corresponding to the each of the plurality of divided regions.

Preferably, but not necessarily, addresses corresponding to each of the plurality of divided regions and the auto focus calibration codes may be sequentially recorded on the look-up table of the memory.

Preferably, but not necessarily, a center region of the image of the object in the plurality of divided regions may be allocated to a first address of the look-up table of the memory.

In still another general aspect of the present disclosure, there is provided an auto focus calibration method of a camera module, the method comprising: dividing an image of an object to a plurality of regions; obtaining an auto focus calibration code for each of the plurality of divided regions; storing the obtained auto focus calibration code for each of the plurality of divided regions in storage.

The present disclosure has an advantageous effect in that an auto focus scanning is performed by reading out from a memory an auto focus calibration code value which is an image region of an object touched by a user, to significantly reduce an auto focus time, whereby focus can be accurately adjusted to prevent a defocusing problem.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. That is, in the drawings, the size and relative sizes of layers, regions and/or other elements may be exaggerated or reduced for clarity. Like numbers refer to like elements throughout and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 7:
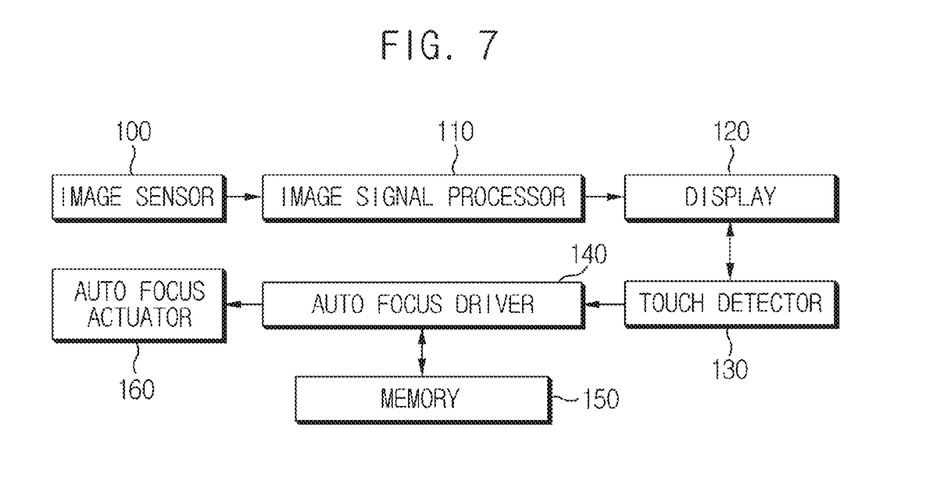
FIG. 7 is a block diagram illustrating a configuration of a camera module according to an exemplary embodiment of the present disclosure.

FIG. 7 is a block diagram illustrating a configuration of a camera module according to an exemplary embodiment of the present disclosure.

The camera module according to an exemplary embodiment of the present disclosure includes an image sensor (100) photographing an image of an object; an image signal processor (110) processing the image of the object photographed by the image sensor (100) and outputting the processed image; a display (120) displaying the image of the object processed by the image signal processor (110); a touch detector (130) detecting if a particular region of the image of the object displayed by the display (120) is touched; a memory (150) stored with an auto focus calibration code of the particular region detected by the touch detector (130); and an auto focus driver (140) receiving a coordinate of the particular region detected by the touch detector (130), reading out from the memory unit (150) an auto focus calibration code corresponding to the particular region of the image of the object displayed on the display (120), and driving an auto focus actuator (160).

Thus, the touch detector (130) of the camera module detects that a particular region is touched, in a case a user touches the particular region performing an auto focus on an image of an object displayed on the display (120). Furthermore, the auto focus driver (140) reads out from the memory (150) an auto focus calibration code corresponding to a particular region of the image of the object displayed on the display (120) to drive the auto focus actuator (160), where the camera module may be expressed by a device and a system including a camera.

Furthermore, the memory (150) may be stored with each of auto focus calibration codes of a plurality of regions divided from the image of the object. In addition, the memory (150) may be stored with look-up tables recorded with addresses allocated with codes relative to infinity auto focus calibration and macro auto focus calibration.

Meanwhile, the particular region of the image of object displayed on the display may be one of a plurality of regions divided from the image of the object displayed on the display. Furthermore, the each of the plurality of divided regions may have a same size.

In addition, the memory may be stored with different auto focus calibration codes each corresponding to the each of the plurality of divided regions. Still furthermore, the memory may be stored with different auto focus calibration codes each corresponding to the each of the plurality of divided regions.

Still furthermore, addresses corresponding to each of the plurality of divided regions and the auto focus calibration codes may be sequentially recorded on the look-up table of the memory. Meanwhile, a center region of the image of the object in the plurality of divided regions may be allocated to a first address of the look-up table of the memory.

Figure 8:
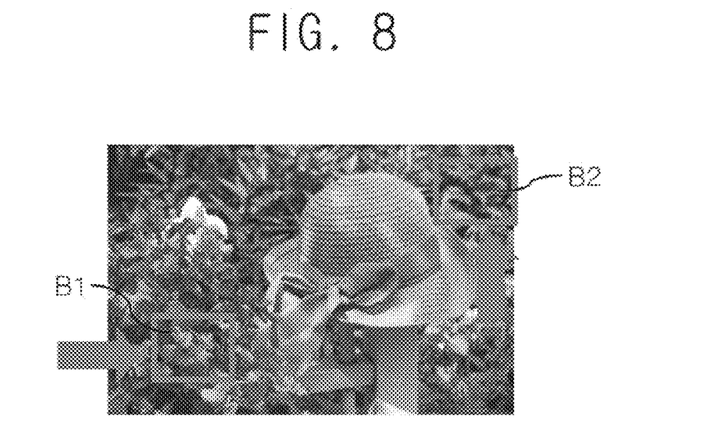
FIG. 8 is a photograph illustrating a touched predetermined region of an image of an object displayed on a display of a camera module according to an exemplary embodiment of the present disclosure.
Figure 9:
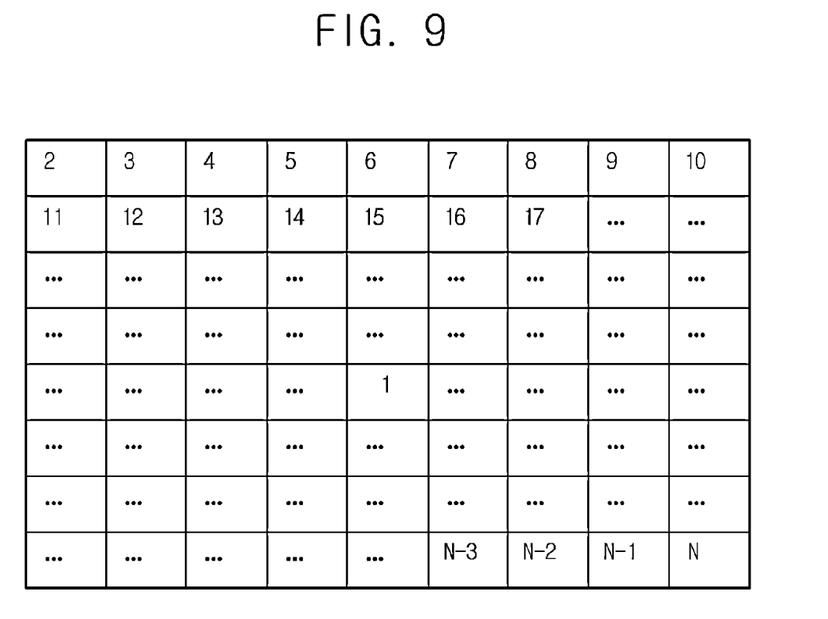
FIG. 9 is a schematic view illustrating an auto focus calibration method of a camera module according to an exemplary embodiment of the present disclosure.
Figure 10:
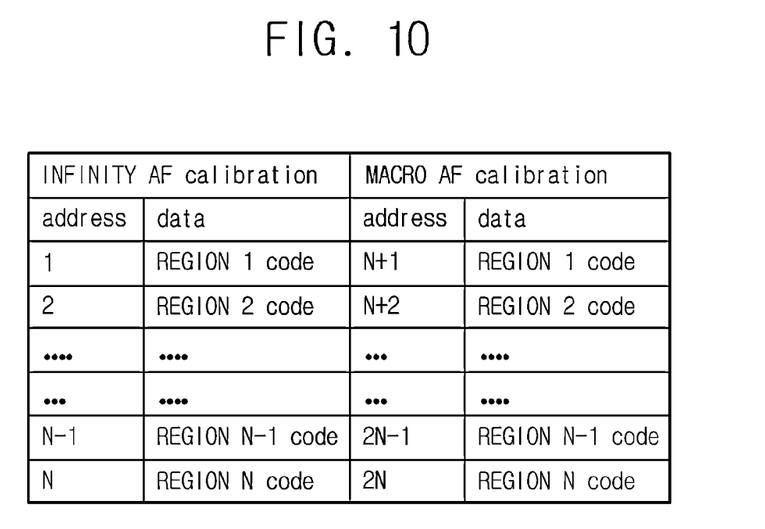
FIG. 10 is a schematic view illustrating an auto focus calibration code stored in a memory of a camera module according to an exemplary embodiment of the present disclosure.

FIG. 8 is a photograph illustrating a touched predetermined region of an image of an object displayed on a display unit of a camera module according to an exemplary embodiment of the present disclosure, FIG. 9 is a schematic view illustrating an auto focus calibration method of a camera module according to an exemplary embodiment of the present disclosure, and FIG. 10 is a schematic view illustrating an auto focus calibration code stored in a memory of a camera module according to an exemplary embodiment of the present disclosure.

As explained above, in order to for a user to auto-focus a particular region in an image of an object displayed on a display in the camera module according to an exemplary embodiment of the present disclosure, the only thing is for the user to simply touch the particular region.

By way of non-limiting example, as illustrated in FIG. 8, in a case a particular region 'B1' or 'B2' is touched on an image of the object displayed on the display, the touch detector detects the touched particular region 'B1' or 'B2', and the auto focus driver drives the auto focus actuator using an auto focus calibration code corresponding to the particular region touched by the touch detector to auto-focus the particular region in the image of the object.

Furthermore, as depicted in FIG. 9, the auto focus calibration method is to divide the image of the object into a plurality of regions, obtains an auto focus calibration code for each divided plurality of regions, and store the each auto focus calibration code of the obtained plurality of regions in the storage.

At this time, a center region of the image of the object in the plurality of divided regions is allocated to a first address of the look-up table of the memory. Furthermore, as illustrated in FIG. 10, look-up tables are recorded with addresses allocated with codes relative to infinity auto focus calibration and macro auto focus calibration, and stored in the memory.

Figure 11:
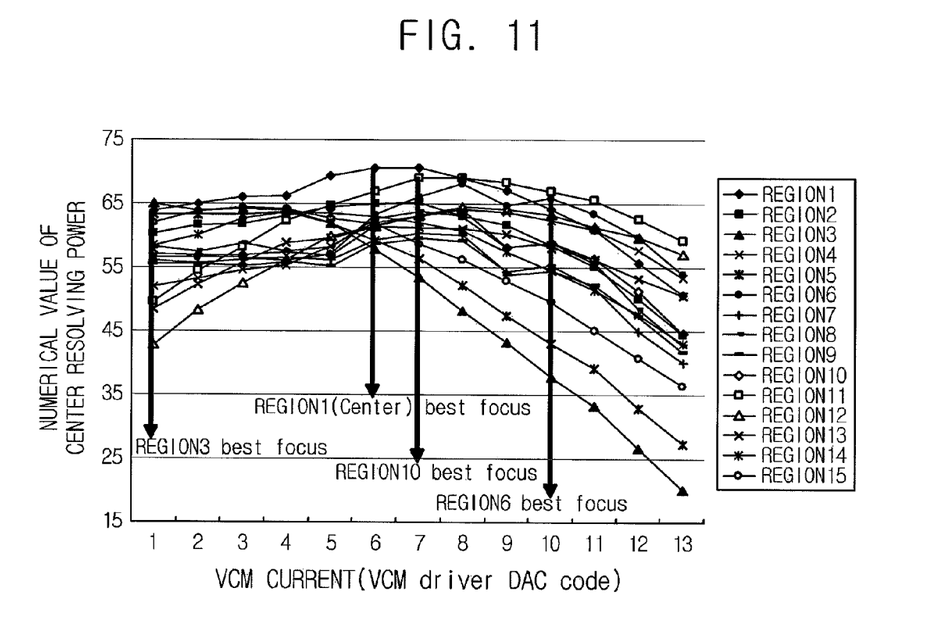
FIG. 11 is a graph illustrating a resolving power of macro auto focus calibration of a camera module according to an exemplary embodiment of the present disclosure.

FIG. 11 is a graph illustrating a resolving power of macro auto focus calibration of a camera module according to an exemplary embodiment of the present disclosure.

Now, a graph illustrating a resolving power of macro auto focus calibration of each divided region of an object will be described. In a case the camera module adjusts a focus on a region 3, there is no need of performing the auto focus scanning up to a center region best focus, because a code value of the region 3 is smaller than that of a region 1 which is a center region.

Thus, according to an exemplary embodiment of the present disclosure, an auto focus time can be remarkably decreased, in a case a user reads out from the memory an auto calibration code value of an image region of an object touched by the user to perform the auto focus scanning.

In a case the camera module adjust a focus on a region 6, there is a chance of erroneously adjusting the focus, because the code value of region 6 is greater than that of region 1 which is a center region, in a case the auto focus scan is performed up to a best focus code of the center region during auto focusing. Thus, in the exemplary embodiment of the present disclosure, defocusing can be prevented because the focus can be accurately adjusted by auto focus scan after reading out from the memory an auto calibration code value matching to the region 6 which is an image region of an object touched by the user.

In short, in the exemplary embodiment of the present disclosure, an auto focus time and focus can be adjusted that are optimized to each region by performing an auto focus catering to characteristics of image regions of the object.

Figure 12:
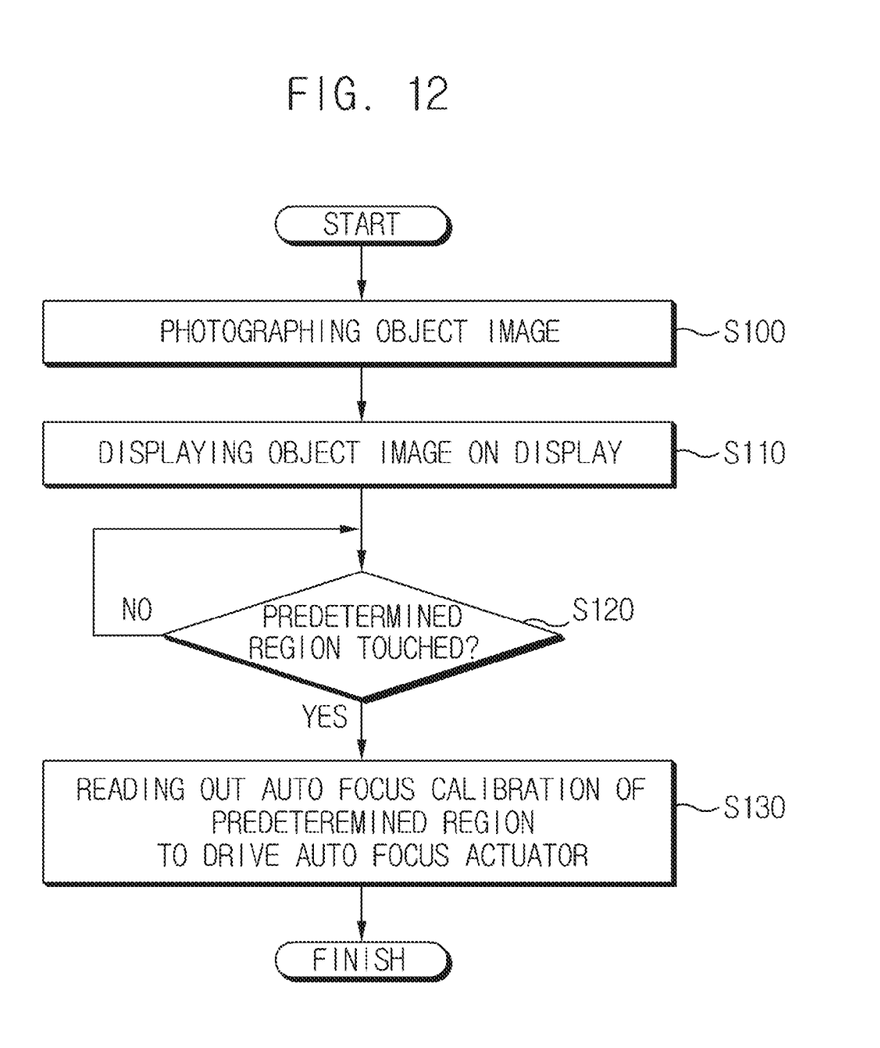
FIG. 12 is a flowchart illustrating an auto focus method of a camera module according to an exemplary embodiment of the present disclosure.

FIG. 12 is a flowchart illustrating an auto focus method of a camera module according to an exemplary embodiment of the present disclosure.

The auto focus method of a camera module according to an exemplary embodiment of the present disclosure is to first photograph an image of an object (S100).

Then, the photographed image of the object is displayed on a display (S110). A determination is made as to whether a predetermined region of the image of the object displayed on the display is touched (S120). An auto focus calibration code of a predetermined region stored in the a memory is read out to drive an auto focus actuator, in a case it is determined that the predetermined region of the image of the object displayed on the display is touched (S130).

Although the present disclosure has been described with reference to a number of illustrative embodiments thereof, it should be understood that numerous other modifications and embodiments can be devised by those skilled in the art that will fall within the spirit and scope of the principles of this disclosure.

What is claimed is:

1. A camera module, the camera module comprising:
   an image sensor photographing an image of an object;
   an image signal processor processing the image of the object photographed by the image sensor and outputting the processed image;
   a display displaying the image of the object processed by the image signal processor;
   a touch detector detecting whether a particular region of the image of the object displayed on the display is touched by a user; a memory stored with an auto focus calibration code of the particular region, wherein the memory includes a look-up table sequentially recorded with addresses allocated with codes relative to infinity auto focus calibration and macro auto focus calibration; and
   an auto focus driver performing an auto focus on the image of the object touched on the display using the auto focus calibration code of the particular region stored on the look-up table in the memory,
   wherein each of auto focus calibration codes corresponds to each of a plurality of particular regions divided from the image of the object displayed on the display and is recorded as the address on the look-up table in the memory,
   wherein the auto focus driver receives a coordinate of the particular region detected by the touch detector, reading out from the memory the auto focus calibration code corresponding to the particular region of the image of the object touched on the display, and driving an auto focus actuator to perform an auto focus scan to the particular region of the image of the object touched by the user on the display.

2. The camera module of claim 1, wherein the particular region of the image of object displayed on the display is one of a plurality of regions divided from the image of the object displayed on the display.

3. The camera module of claim 2, wherein the each of the plurality of divided regions has a same size.

4. The camera module of claim 2, wherein the memory is stored with different auto focus calibration codes each corresponding to the each of the plurality of divided regions.

5. The camera module of claim 4, wherein addresses corresponding to each of the plurality of divided regions and the auto focus calibration codes are sequentially recorded on the look-up table of the memory.

6. The camera module of claim 5, wherein a center region of the image of the object in the plurality of divided regions is allocated to a first address of the look-up table of the memory.

7. An auto focus method of a camera module, the method comprising:
  photographing an image of an object;
  displaying the photographed image of the object on a display;
  dividing the image of the object into a plurality of regions;
  obtaining an auto focus calibration code for each divided plurality of regions;
  storing the each auto focus calibration code of the obtained plurality of regions sequentially on a look-up table in a storage;
  determining whether a predetermined region of the image of the object displayed on the display is touched;
  reading out the auto focus calibration code stored in a memory of the predetermined region touched by a user;
  driving an auto focus actuator to perform an auto focus scan after reading out from the storage the auto calibration code matching to the predetermined region of the object touched by the user so as to adjust a focus of the predetermined region.

8. The method of claim 7, wherein the predetermined region of the image of object displayed on the display is one of a plurality of regions divided from the image of the object displayed on the display.

9. The method of claim 8, wherein the each of the plurality of divided regions has a same size.

10. The method of claim 8, wherein the memory is stored with different auto focus calibration codes each corresponding to the each of the plurality of divided regions.

11. The method of claim 10, wherein addresses corresponding to each of the plurality of divided regions and the auto focus calibration codes are sequentially recorded on the look-up table of the memory.

12. The method of claim 11, wherein a center region of the image of the object in the plurality of divided regions is allocated to a first address of the look-up table of the memory.

* * * * *